United States Patent Office 3,843,561
Patented Oct. 22, 1974

3,843,561
MAT OF INORGANIC OXIDE FIBERS, ITS METHOD OF PREPARATION AND ITS IMPREGNATION WITH CATALYTIC MATERIALS

Jay E. Sobel, Highland Park, Ill., assignor to Universal Oil Products Company, Des Plaines, Ill.
Continuation-in-part of application Ser. No. 36,732, May 13, 1970. This application Aug. 22, 1972, Ser. No. 282,797
Int. Cl. B01j *11/06, 11/12*
U.S. Cl. 252—465       10 Claims

ABSTRACT OF THE DISCLOSURE

A preformed mat of fibrous material and the method for preparing the same. Also included is a fluid contacting chamber utilizing a particular form of the mat of fibrous material. The mat comprises a fibrous, flexible, porous, refractory inorganic oxide material which is wound onto a mandrel in a plurality of layers to form a resulting annularly shaped form. The mat is capable of being utilized as filtering media, adsorption-absorption media, catalyst, and/or catalyst support.

---

This application is a continuation-in-part of a copending application, Ser. No. 36,732, filed May 13, 1970, and now abandoned.

SPECIFICATION

The present invention relates to a mat of fibrous material and the method of preparation. More specifically, the invention is directed to a mat formed of long fibrous, flexible, porous, refractory inorganic oxide material for utilization in the contacting of a fluid flow and to the method of preparing the mat. It is also directed to a particular type of fluid contacting chamber utilizing one form of the resulting mat.

The use of materials of various types, configurations and substances suitable for contacting fluid streams, is generally well known in both consumer and industrial applications. Examples are: filtration applications, wherein fibers of various sorts are used to filter out solid particulates in a fluid stream; catalytic reaction applications wherein materials of particulate form are utilized as a catalyst support or catalyst for varous types of catalytic reactions in refineries, etc.; or in different "sieve" applications wherein materials of various forms are utilized to separate or adsorb components of fluid streams. However, it is believed that the particular form of the preformed mat disclosed herein, the method of preparing the mat, the particular fluid contacting chamber, as well as the preferred materials for forming said mat is a novel concept.

Thus, it is a principal object of this present invention to provide for a special form of mat of fibrous material suitable for contacting a fluid flow.

It is also an object of this invention to provide a method of preparing a special form of mat from long fibrous material suitable for contacting a fluid flow.

More particularly, it is an object of this present invention to provide a mat of fibrous material suitable for contacting a fluid flow and the method of preparing the same, the mat of fibrous material being structured from a fibrous, flexible, porous, refractory inorganic oxide material of long staple form.

Still another object of this invention is to provide for a mat of fibrous material suitable for contacting a fluid flow and the method of preparing the same, the mat of material being suitable for catalytic reactor utilization and being structured from a flexible, fibrous, porous refractory inorganic oxide material of long staple form.

Still another object of this present invention is to provide a mat of fibrous material of an annularly shaped form and the method of preparing the same.

Another object of this present invention is to provide for a fluid contacting chamber utilizing an annularly shaped mat of fibrous material, the fluid contact material being structured from a fibrous material of long staple form that has been wound to have a plurality of recrossing layers.

In one of its broadest aspects, the present invention provides for a tubular mat of fibrous material suitable for contacting a fluid flow, which comprises a plurality of layers of fibrous, flexible, porous, refractory inorganic oxide material, each layer comprising a long fiber wound helically into a tubular form. In this resulting annularly shaped form, the mat may be cut to form a flat mat or may be utilized in an annularly shaped chamber or section of a chamber. By referring to the form of each layer as tubular, it is meant to encompass other than circular cross-sections, such as oval and the like.

Also considered as a part of this invention is a method for preparing a mat of fibrous material suitable for contacting a fluid flow. The method comprises helically winding a plurality of layers of fiber of a long flexible, porous, refractory inorganic oxide configuration onto a mandrel to form a resulting annularly shaped mat.

A preferred source of fibers for utilization in conjunction with the present invention is a method which comprises mixing a refractory inorganic oxide sol with a fiber-forming organic polymer; drawing or spinning fibers from the mixture; and consequently burning off the organic ingredient and calcining the fiber to a flexible, porous structure. The resulting inorganic refractory oxide fibers are capable of being utilized as a filtering media, an adsorption-absorption media, a catalyst, and/or a catalyst support.

The refractory inorganic sol utilized in accordance with the method set forth heretofore includes hydrous sols, for example, an alumina sol, chromia sol, zirconia sol, silica sol, thoria sol, and the like, as well as combinations thereof, such as alumina-chromia sols, alumina-zirconia sols, etc., to form the corresponding refractory inorganic oxide fibers. Said sols include those sols resulting from hydrolysis and concentrations of aqueous solutions of one or more appropriate salts, such as zirconium acetate, whereby a colloidal dispersion, stable in the remaining liquid, is formed. For purposes of illustration, the method will be described with reference to the preparation of alumina fibers but with the understanding that the method is also applicable to the preparation of fibers comprising other inorganic oxides or combinations thereof. The alumina sols herein contemplated can be prepared by the hydrolysis of a suitable acid salt of aluminum such as aluminum chloride, aluminum sulfate, aluminum nitrate, aluminum acetate, etc., in aqueous solution, and treating said solution at conditions to form an acid anion deficient solution or sol. Reduction in the concentration of acidic anion formed by the hydrolysis reaction may be accomplished in any conventional or otherwise convenient manner. Thus, the acid anion concentration can be reduced by utilizing aluminum metal as a neutralizing agent. In this case, the salt of neutralization is an aluminum salt subject to hydrolysis in the ultimate sol formulation. In some cases, as in the case of aluminum acetate, when the acid anion is sufficiently volatile, the desired acid anion deficient solution or sol may be prepared simply by heating. Another method of producing a suitable alumina sol is in the electrolysis of an aluminum salt solution, such as an aqueous aluminum chloride solution, in an electrolytic cell having a porous partition between anode and cathode whereby an anion deficient aluminum salt solution, or sol, is recovered from the cathode compartment.

Preferably, the sol is an aluminum chloride sol prepared, for example, by digesting aluminum pellets or slugs in aqueous hydrochloric acid and/or aluminum chloride solution—usually at about reflux temperature. Aluminum chloride solutions are preferably prepared to contain aluminum in from about a 1:1 to about a 2:1 atomic ratio with the chloride anion.

Alumina or other refractory inorganic oxide sols are capable of being formed into a tacky, viscous material which may be drawn into fibers or fine filaments, as set forth in U.S. Pat. 3,614,809 and 3,632,709. However, difficulty has been found in making or spinning such fibers or filaments into extended lengths as would be suitable to wind on a spool and then unwind to form layers around a mandrel and, as a result, it is preferable to include a fiber-forming organic polymer with the sol as heretofore noted.

The selected fiber-forming organic polymer must be substantially stable at fiberizing conditions. The soluble, fiber-forming, organic polymers as contemplated herein include the modified natural products prepared as water soluble derivatives of natural occurring, fiber-forming, organic polymers or resins. Thus, the soluble, fiber-forming, organic polymers can be a starch derivative such as starch acetate, starch ether, anion starches, etc., or a soluble cellulose derivative, for example, the alkyl and hydroxy alkyl cellulose derivatives like methylcelluose, ethylcellulose, ethylmethylcellulose, hydroxyethylcellulose, hydroxyethylmethylcellulose, hydroxypropylmethylcellulose, ethylhydroxymethylcellulose, etc., and also water-soluble derivatives such as carboxymethylcellulose, carboxymethylhydroxyethylcellulose, and the like. Preferably, the soluble, fiber-forming, organic polymer is a synthetic product such as soluble polyalcohols, polyacids, polyamines, polyethers, and polyamides, derived from the variety of synthetic monomers. Suitable synthetic organic polymers include the soluble polyvinylalcohols, polyurethanes, polyacrylic acid salts, polyacrylamides, polyvinylmethyl ethers, polyvinylpyrrolidones, polyethylene oxides, and the like. A selected organic polymer must also be substantially stable at fiberizing conditions, i.e., in the temperature range of from about 5° to about 90° C. Also, suitably, the organic polymer may comprise from about 0.5 to about 25 wt. percent of the reaction mixture, although larger amounts could be used. Since the organic polymer is expended in the fiber making process, it is desirable to utilize a minimum amount commensurate with a desired product fiber quality.

Actually, the inclusion of a soluble fiber-forming, organic polymer in the sol imparts an added cohesiveness thereto which enables the sol to be drawn or stretched into longer, finer fibers or filaments of an orderly molecular arrangement or orientation before the sol sets to a gel. The end result is upon subsequent calcination, a refractory inorganic oxide fiber of improved strength and flexibility.

The reaction mixture thus prepared is concentrated to a tacky consistency while maintaining a substantially liquid phase. The reaction mixture is suitably reduced to the desired consistency by the evaporation of water therefrom, suitably by simple evaporation upon standing or upon stirring in an open vessel, but more conveniently by treating in a vacuum evaporator at ambient temperature, a tacky consistency being achieved at a viscosity of from about 1 to about 20,000 poise. The further evaporation of water and initial gelation of the sol is effected as the concentrated reaction mixture is being drawn into stable fibers in an atmosphere of controlled temperature and humidity.

Fiberizing conditions relate principally to the temperature and humidity of the environment in which the fibers are formed. The relatively large surface area presented by the fibers in the process of being formed permits a relatively rapid evaporation of moisture therefrom with the formation of a stable fibrous hydrogel, provided that the moisture content of the environment is sufficiently low. If, however, the moisture is too high, the desired rapid evaporation does not occur and the fibrous hydrosol may in effect absorb sufficient moisture to collapse in a formless mass. The fiberizing environment should comprise a relative humidity of less than about 80%, and preferably from about 10% for extrusion spinning. The temperature of the fiberizing environment is somewhat less critical and may be from about 5° to about 90° C., and preferably from about 25° to about 90° C. The described reaction mixture may be procesed or formed into fibers by a slow and constant injection of the concentrated reaction mixture into the atmosphere of controlled humidity and temperature, drawing the injected mixture into fibers and subjecting the fibers thus formed to a specific heat treatment to yield a porous, flexible product. The reaction mixture may be extruded or passed through a perforated plate comprising one or more relatively large orifice openings, the resulting fibers being rapidly attenuated using the material being extruded or pulled through the perforated plate as a constant feed. In any case, the reaction mixture is preferably drawn or extruded into fibers with a maximum diameter of less than about 20 microns for improved flexibility.

The fibers thus formed are thereafter calcined at a temperature of at least about 300° C., and preferably from about 300° C. to about 1000° C., in an air atmosphere, whereby the organic matter is burned from the fibers and a flexible refractory inorganic oxide product is recovered. As will be apparent with reference to the appended examples, the incorporation of a soluble, fiber-forming, organic polymer in the sol subsequently processed into fibers, results in a yield of porous, flexible fibers.

In summary, one preferred embodiment of making the fiber for the present invention relates to a method of preparing alumina fibers which comprises preparing an alumina sol by effecting a reduction in the chloride anion concentration of an aqueous aluminum chloride solution, said sol containing from about 12 to about 14 wt. percent aluminum in from about a 1:1 to about a 2:1 atom ratio with the chloride content thereof; admixing a soluble polyethylene oxide polymer therewith and forming a substantially liquid phase mixture, said polymer comprising from about 0.5 to about 25 wt. percent of said mixture; concentrating the mixture to a viscosity of from about 1 to about 20,000 poise; and thereafter drawing the concentrated mixture into fibers in an atmosphere characterized by a relative humidity of from about 30% to about 60% and a temperature of from about 25° to about 90° C., and calcining the resulting fibers in air at a temperature of from about 300° to about 1000° C.

The following examples are presented in illustration of the method for making the desired form of flexible fiber of this invention and are not intended as an undue limitation of the generally broad scope of the invention as set out in the appended claims.

EXAMPLE I

An alumina sol was prepared by digesting an excess of aluminum metal in aqueous hydrochloric acid under reflux conditions (98°–115° C.). The sol analyzed 12.49% aluminum, 10.75% chloride and had a specific gravity of 1.3630. To 67.0 grams of the sol was added, with stirring, 80 grams of a 5 wt. percent aqueous polyurethane solution. The reaction mixture was concentrated by the evaporation of water therefrom while maintaining substantially liquid phase conditions. The concentrated reaction mixture was drawn into fibers in an atmosphere characterized by a relative humidity of 45–55% and a temperature of 20–30° C. The organic matter was burned from the fibers and the fibers calcined for about 1 hour at a temperature of 550° C. in air. The mean diameter of the calcined fibers was about 4 microns. Measurement of surface area properties by nitrogen absorption indicated a surface area of 100 m.$^2$/gm., a pore volume of 0.14 cc./gm. and a pore diameter of 56 A. The fibers were very flexible and resilient.

EXAMPLE II

A chromia-alumina sol was prepared by digesting aluminum metal in aqueous chromium chloride solution. The sol analyzed 10.02% aluminum, 2.87% chromium and 10.14% chloride. The specific gravity of the sol was 1.349. To 118.7 grams of the sol was added, with stirring, 6.2 grams of polyvinylpyrrolidone having an average molecular weight of about 40,000. The reaction mixture was concentrated by the evaporation of water therefrom while maintaining substantially liquid phase conditions. The concentrated reaction mixture was drawn into fibers in an atmosphere characterized by a relative humidity of 45–55% at a temperature of 20–30° C. The organic matter was burned from the fibers and the fibers calcined at a temperature of about 550° C. in air. The mean diameter of the calcined fibers measured 6 microns. Measurement of surface properties by nitrogen absorption indicated a surface area of 327 m.$^2$/gm., a pore volume of 0.23 cc./gm. and a pore diameter of 28 A. The fibers were very flexible and resilient.

As a catalyst support, the resulting inorganic refractory oxide fibers may be impregnated with a catalytic active metal or metallic oxide. Of particular interest are those catalysts comprising one or more metals of Group IB, V, VI, VII, VIII, including molybdenum, tungsten, chromium, palladium, copper, nickel, platinum, iron, cobalt, ruthenium, rhodium, osmium, and iridium. Regardless of the particular refractory materials employed and regardless of the particular method selected for preparation of such a support, the catalytically active metallic component may be added to the inorganic refractory oxide in any suitable, convenient manner.

The present invention also provides for a fluid contacting chamber including a mat of fibrous material, said mat comprising a plurality of layers of fibers of a flexible porous inorganic refractory configuration helically wound around a tubular-form screen having perforations therein, the interior of said tubular-form screen section establishing a fluid distribution manifold for said contact material and the perforations therein establishing communication from said distribution manifold to said fibrous material.

The mat of fibrous material, the method for preparing the same, and the chamber in which such a mat may be used, as well as other advantageous features in connection therewith, are better set forth and explained by reference to the accompanying diagrammatic drawing and the following description thereof.

Figure 1:
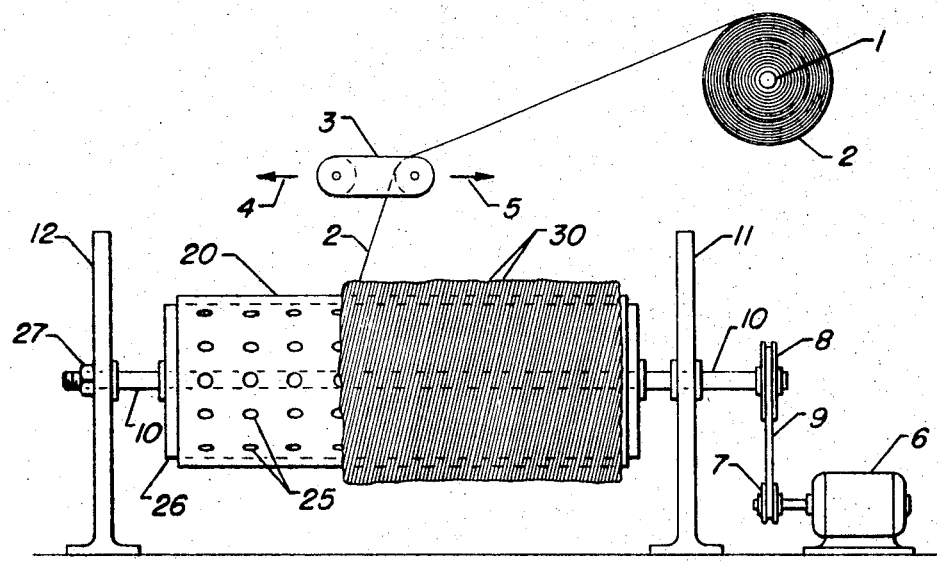
FIG. 1 is a schematical representation of a method for preparing the annular-shaped mat of fibrous material.

Referring now more particularly to FIG. 1 of the drawing, there is shown schematically an apparatus that may be utilized in winding a mat of fibrous material. Shown is a reel or spool means 1 which has been wound with a fiber or yarn of a flexible, porous, refractory inorganic oxide configuration 2 that has been prepared by a suitable method for making a long flexible filament. It may be a fiber of catalyst form, or a fiber that is suitable for the support of a catalytic component, or a fiber which has already been impregnated with that catalyst. For purposes of illustration, the means for supporting the spool is not shown, but may be by conventional manner. The spool itself may be caused to rotate by power means also not shown, but on the other hand, may be provided with a tension clutch to maintain proper tension in the fiber or yarn as it is being wound. The fiber or yarn 2 is threaded through a torus 3 or other form of guide means which is supported by suitable means not shown, which will be powered to move back and forth at a programmed rate in the directions 4 and 5. Also included in this apparatus is a motor 6 having a shaft to which a pulley 7 is connected. Pulley 7 communicates with a pulley 8 via a belt 9 which in turn is connected to a shaft 10 which is supported by posts 11 and 12 in a manner which allows it to rotate within the confines of the posts 11 and 12. To the shaft 10 a mandrel 20 is connected on which the fiber or yarn 2 is to be wound. Mandrel 20 may be a permanent type mandrel used only as a form on which the fiber 2 is wound, or, on the other hand, it may be perforated and thus serve as a tubular-form perforate screen for a contact chamber in which it may be utilized, which is the case in FIG. 1 since perforations 25 are shown in the drawing. Since the tubular-form screen section or mandrel 20 is hollow, it is supported via a cylinder 26 which is connected to the shaft 10. To remove the resulting annularly shaped mat from the apparatus, the left-hand portion of the shaft 10 may be provided with a removable connector 27, and support post 12 may be provided with a provision so that it may be swung away from shaft 10. Thus, after winding the fiber or yarn 2 onto the removable mandrel, the mandrel may be removed by disconnecting connector 27 and swinging post 12 clear of shaft 10. Of course, the apparatus of FIG. 1 is presented by way of example, and other apparatus of more complex nature may be provided for carrying out the method of this invention.

The mat is formed by helically winding a plurality of layers of the fiber 2 onto the mandrel to form the resulting mat 30. This is accomplished by turning the shaft 10 via motor 6 at a programmed rate of speed and moving the guide means 3 at a programmed rate in the two directions 4 and 5. To maintain the fiber or yarn at a constant tautness, a tension clutch may be provided in the supporting means of reel 1. Thus, as the guide means 3 moves longitudinally across the mandrel 20, a layer of a fiber is wound helically into a tubular form. The resulting mat comprises a plurality of layers of the fibrous material. The density of the resulting mat may be controlled by controlling the helical angle or pitch distance between revolutions of the fiber. A more dense mat will be formed by winding the fiber through a smaller helical angle. The particular method enables one to form a uniformly dense mat with a substantial control of the density. For some purposes and some fibrous materials, a setting agent may be utilized in conjunction with the fiber to aid in forming a coherent mat of material. The resulting mat 30 with the screen 20 or without the screen may then be cut and flattened out to form a relatively flat-shaped mat of fibrous material, or, on the other hand, it may be used in its present form, that being an annularly shaped form. Of course, if the mandrel is not needed for the finished product, it may form a permanent part of the apparatus.

Figure 2:
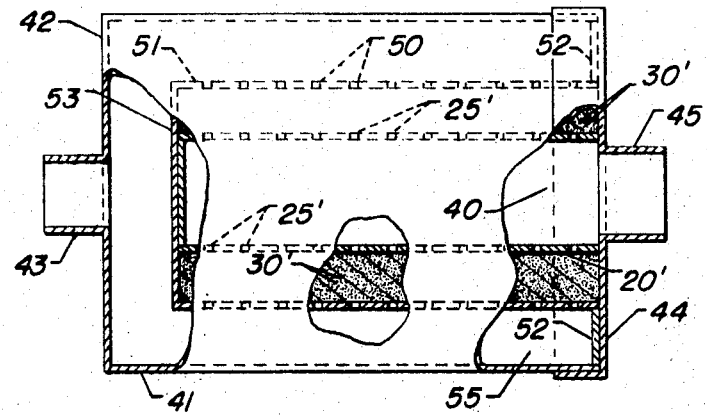
FIG. 2 is a sectional view of an embodiment of a contact chamber utilizing a mat similar to the mat of FIG. 1.

Referring now more particularly to FIG. 2 of the drawing, there is shown a fluid contacting chamber which may be a catalytic reactor and which includes a mat of fibrous material 30'. Mat 30' comprises a plurality of layers of fibrous, flexible, porous, refractory inorganic oxide material which have been helically wound around a tubular-form screen 20' having perforations 25' thereon. Thus, it is seen that mat 30' is a proportional modification of the annular mat of FIG. 1 which includes the screen or mandrel 20'. The interior 40 of the tubular-form screen 20' establishes a fluid distribution manifold for the contact material and the perforations 25' establish communication from the distribution manifold to the fibrous contact material 30'. Also included in this particular contact chamber is a tubular-form outer housing 41 which has an end closure means 42 with a port means 43 and a removable end closure means 44 with a port means 45 communicating with a manifold section or the interior 40 of screen 20'. A large tubular-form perforate screen 50 with perforations 51 therein is connected to the outer housing 41 via end plates 52. Screen section 50 is also of a tubular form and has an end closure means 53.

Tubular-form screen section 50 is spaced from the outer housing 41 to form a distribution manifold 55 communicating with the fibrous contacting material via the perforations 51. It is contemplated that for certain applications screen 50 be omitted from the fluid contacting chamber.

The mat 30' with the perforated screen 20' was inserted into the space defined by the interior of screen 50 and subsequently the end closure means 44 was placed and sealed onto the outer housing 41 to form the resulting fluid contacting chamber. Thus, it is seen that a fluid contacting chamber utilizing the annular-shaped mat formed by the method as set forth hereinbefore is fabricated in a relatively uncomplicated manner. Actually, the mat of fibrous material is a cartridge when utilized in the chamber of FIG. 2. If used for a filter or reactor application, after the fibrous material becomes contaminated or useless in some way, end portion 44 could be removed, and the fibrous mat with screen could be replaced.

Of course, the chamber as shown in FIG. 2 is a schematical representation and all the details of construction are not shown. For example, to facilitate the seal and attachment of end section 44 to the chamber, bolts or other forms of fastening means would be needed. Actually, the chamber is ideally suited for catalyst reactions. That is, the fibrous inorganic oxide material may serve as a catalyst or a catalyst support material having a catalyst impregnated thereon.

It is to be noted that the specific examples herein shown and described are illustrative only and any variations in structure, proportions, and member thickness should be considered to form part of this invention inasfar as they fall within the spirit and scope of the claims.

I claim as my invention:

1. An annular form fluid pervious mat of fibrous material that is suitable for the contact of a fluid flow therethrough, which comprises, a plurality of recrossing helically wound layers of long, flexible, porous high surface area refractory inorganic oxide fiber, with said fiber having been prepared by forming a non-hollow fiber from a mixture of a refractory inorganic oxide sol and a fiber-forming organic polymer and by subsequently calcining the fiber at a temperature of from about 300 to about 1000° C. to burn off the fiber-forming organic polymer portion of the composite.

2. The mat of Claim 1 further characterized in that said inorganic oxide sol is an alumina.

3. The mat of Claim 1 further characterized in that said inorganic oxide sol is chromia-alumina.

4. The mat of Claim 1 further characterized in that said fiber is impregnated with a catalytically active metal or metal oxide.

5. The mat of Claim 1 further characterized in that said catalytic impregnation is with platinum.

6. A method of preparing a fluid pervious mat of fibrous material for contacting a fluid flow which comprises the steps of:
   (a) drawing long flexible fibers from a mixture of a refractory inorganic oxide sol and a fiber-forming organic polymer at fiberizing conditions;
   (b) calcining the resulting drawn fibers at a temperature of from about 300 to about 1000° C. whereby the fiber forming organic polymer is burned off the fiber to form a resulting flexible, porous, refractory inorganic oxide fiber; and
   (c) helically winding said resulting fiber back and forth over a mandrel to provide a plurality of recrossing layers and to form a resulting annularly shaped mat.

7. The method of Claim 6 further characterized in that said inorganic oxide sol is alumina.

8. The method of Claim 6 further characterized in that said inorganic oxide sol is chromia-alumina.

9. The method of Claim 6 further characterized in that said fiber is impregnated with a catalytically active metal or metal oxide.

10. The method of Claim 9 further characterized in that said impregnating is with platinum.

References Cited

UNITED STATES PATENTS

| | | | |
|---|---|---|---|
| 3,697,447 | 10/1972 | Bettinardi | 252—477 R |
| 3,614,809 | 10/1971 | Hayes et al. | 65—11 R |
| 3,632,709 | 1/1972 | Hayes et al. | 106—65 X |
| 3,529,044 | 9/1970 | Santangelo | 23—202 X |
| 3,560,408 | 2/1971 | Kiehl et al. | 423—214 X |
| 3,663,182 | 5/1972 | Hamling | 423—263 X |

DANIEL E. WYMAN, Primary Examiner

W. J. SHINE, Assistant Examiner

U.S. Cl. X.R.

252—463, 466 PT, 477 R; 423—213.2, 213.5; 23—288 F; 55—520, 523, 527; 210—497.1